(12) United States Patent
Petzold

(10) Patent No.: US 6,301,984 B1
(45) Date of Patent: Oct. 16, 2001

(54) GEAR SHIFTING DEVICE

(75) Inventor: Rainer Petzold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/581,299

(22) PCT Filed: Dec. 15, 1998

(86) PCT No.: PCT/EP98/08201

§ 371 Date: Jun. 12, 2000

§ 102(e) Date: Jun. 12, 2000

(87) PCT Pub. No.: WO99/32809

PCT Pub. Date: Jul. 1, 1999

(30) Foreign Application Priority Data

Dec. 19, 1997 (DE) .............................. 197 56 637

(51) Int. Cl.$^7$ ................................................. F16H 59/00
(52) U.S. Cl. ............................................................ 74/335
(58) Field of Search ................................................ 74/335

(56) References Cited

U.S. PATENT DOCUMENTS

| | | | |
|---|---|---|---|
| 3,822,724 | 7/1974 | Clapp et al. | 137/625.5 |
| 4,570,502 | 2/1986 | Klatt | 74/335 |
| 4,774,624 | 9/1988 | Qualich | 361/159 |
| 5,970,810 | * 10/1999 | Wadas | 74/335 |
| 5,992,267 | * 11/1999 | Smith et al. | 74/335 |
| 6,102,829 | * 8/2000 | Muddell et al. | 74/335 |
| 6,145,398 | * 11/2000 | Bansbach et al. | 74/335 |

FOREIGN PATENT DOCUMENTS

| | | |
|---|---|---|
| 34 17 473 A1 | 11/1985 | (DE) . |
| 39 38 402 C2 | 5/1995 | (DE) . |
| 195 00 137 A1 | 7/1996 | (DE) . |
| 195 43 646 A1 | 5/1997 | (DE) . |
| 196 10 665 A1 | 9/1997 | (DE) . |
| 196 12 835 A1 | 10/1997 | (DE) . |
| 197 12 389 A | 10/1997 | (DE) . |
| 196 20 037 A1 | 11/1997 | (DE) . |
| 0 059 853 A2 | 9/1982 | (EP) . |
| 0 417 657 A1 | 3/1991 | (EP) . |
| 0 477 564 A2 | 4/1992 | (EP) . |
| 0 487 861 A1 | 6/1992 | (EP) . |
| 0 723 097 A2 | 7/1996 | (EP) . |
| 0 731 298 A2 | 9/1996 | (EP) . |
| 0 750 140 A2 | 12/1996 | (EP) . |
| 2 163 224 A | 2/1986 | (GB) . |
| 97/04254 A1 | 2/1997 | (WO) . |
| 97/05410 | 2/1997 | (WO) . |

OTHER PUBLICATIONS

Japanese Abstract, vol. 007, No. 254 (M–255) dated Nov. 11, 1983 & JP58137652 dated Aug. 16, 1983 to Komatsu Ltd.

Japanese Abstract, vol. 010, No. 331 (M–533) dated Nov. 11, 1986 & JP61136044 dated Jun. 23, 1986 to Limited Kubota Ltd.

* cited by examiner

Primary Examiner—Dirk Wright
(74) Attorney, Agent, or Firm—Davis & Bujold, P.L.L.C.

(57) ABSTRACT

The invention relates to a gear shifting device (118) for connecting parts of a transmission (102) rotation at different rotational speeds with at least one auxiliary unit, the gear shifting device (118) being-actuated by a control fluid. For each auxiliary unit one unit is provided in which valves (4, 5, 6, 7), shift cylinder (1), piston (2) and gear shift elements (2A) are comprised. The gear shifting device (118) is actuated by electrically controlled, pulsed 2/2-way valves (4, 5, 6, 7) and is connected to a displacement measuring device (3) whose signals can be transmitted to the 2/2-way valves (4, 5, 6, 7). The signals are used to control the 2/2-way valves (4, 5, 6, 7) according to the position of the piston (2) which is detected by the displacement measuring device (3) with respect to the shift cylinder (1).

19 Claims, 2 Drawing Sheets

GEAR SHIFTING DEVICE

BACKGROUND OF THE INVENTION

The invention relates to a gear shifting device for a multi-ratio gear-changing transmission.

The problem on which this invention is based is to provide a gear shifting device which makes variable synchronizing times and short gear shifting times possible.

The problem is solved with a gear shifting device with the disclosed of claim 1.

SUMMARY OF THE INVENTION

For each auxiliary unit of the gear-changing transmission, it is proposed that the unit be comprised of valves, shift cylinders, pistons and gear-shifting elements. Pulsed 2/2-way valves are used as release valves. At the same time, a displacement measuring device is used which indicates the actual position of the piston in relation to the shift cylinder.

When engaging the gear wheels in a torque-transmitting connection, it is possible to adapt shift force with the shift time. The adaptation preferably consists of the valves being loaded at a higher frequency when engaging the connection than when disengaging.

In another advantageous development, the pulse frequency of the 2/2-way valves provided when shifting gear on level ground is different from the pulse frequency when shifting gear on non-level ground, i.e. on uphill and downhill gradients. The pulse frequency when shifting gear on level ground is advantageously lower than on a non-level road.

In another advantageous development, the pulsed valve is operated with a voltage which amounts to a multiple of the standard voltage.

The displacement measuring device is preferably situated within the shift cylinder, but it can also be provided in a position outside the shift cylinder where it is connected with the movable part of the unit.

In another advantageous development, the piston of the auxiliary unit is placed upon a piston rod upon which it is axially movable. Upon the piston rod is provided the pistons of the gear shift units of several auxiliary units without hindering each other. The units are preferably disposed in one row for the auxiliary unit concerned.

In another advantageous development, several gear shift units, of which each gear shift unit belongs to an auxiliary unit, are comprised in one part. The part can be assembled separately from the transmission and then adapted and attached to the transmission as a unit. This also makes separate production possible, and testing of a complete gear shifting device independent of the transmission type involved.

In another advantageous development, the shift units have stops which dampen the impact of the piston on the edges of the shift cylinders. The stops can be provided within the shift cylinder or also outside on a part of the shift units connected with the piston.

Contrary to already known gear shifting devices, this whole gear shifting device sits in the immediate proximity of the auxiliary unit. An auxiliary unit is preferably formed of two gear wheels which are disposed side by side in the transmission and can be alternately engaged in the torque transmission. An auxiliary unit, however, can also consist of only one gear wheel engageable in the torque transmission when, e.g. two opposite gear wheels do not have to be engaged when shifting gear to a reverse gear ratio.

By virtue of a compact unit arrangement, it is also possible to eliminate connecting elements between gear shift elements, preferably formed of shift forks or shift levers, and the shift cylinders and shift pistons. As already mentioned, in such connecting elements shift rods are essentially made of steel which to a great extent contributes to the total weight of the transmission. The reaction times between a command to trigger a gear shift and the movement of the shift element is clearly abbreviated by the elimination of the bulky shift rods to be moved.

BRIEF DESCRIPTION OF THE DRAWINGS

The invention is explained in detail with reference to drawings which show.

DESCRIPTION OF THE PREFERRED EMBODIMENTS

Figure 1:
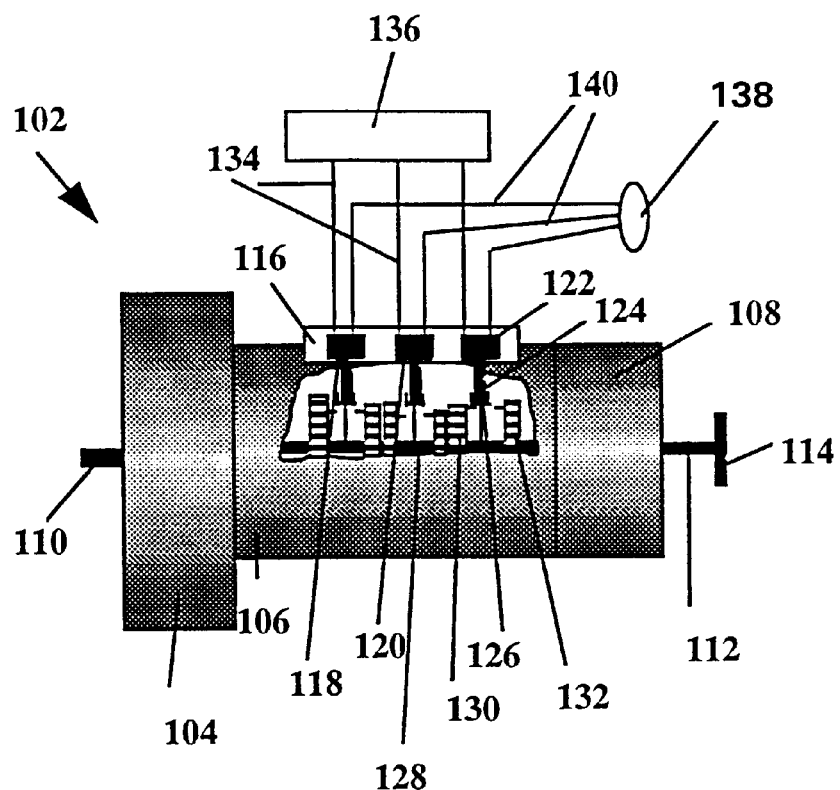
FIG. 1 is transmission with gear shifting devices.

FIG. 1 shows a diagrammatic representation of a transmission 102 in a vehicle (not shown here). The transmission 102 has a clutch bell housing 104, a main gear 106 and an auxiliary gear 108, in addition, an input shaft 110 and an output shaft 112 with output flange 114. A component 116 is provided on the main gear 106. In the arrangement (shown here) the component 116 has three separate gear shifting devices 118, 120 and 122. The gear shifting device 118, shown by way of example, engages with a shift fork 124 in a sliding sleeve 126 which is axially displaceable along a shaft 128 and non-rotatably connected with the shaft 128. As a result of a displacement, the sliding sleeve 126 can be connected either with the gear wheel 130 or the gear wheel 132 to form a torque transmission. The gear shifting devices 118, 120 and 122 are connected, via electric lines 134, with a control device 136 such as an electronic transmission computer or vehicle master. The gear shifting devices 118, 120 and 122 are likewise connected, via lines 140, with a supply device 138 for an actuation fluid.

Figure 2:
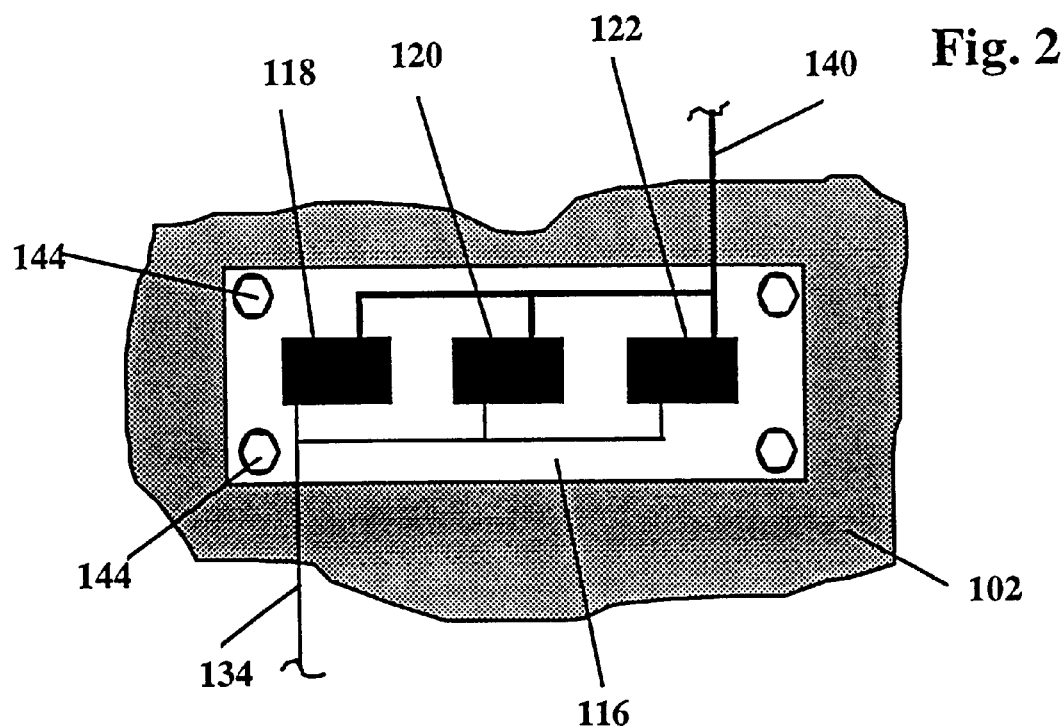
FIG. 2 is an arrangement of gear shifting devices in a row.

FIG. 2 shows a segment of the housing of transmission 102, where in one part 116, the gear shifting devices 118, 120 and 122, are comprised. The component 116 is fastened on the transmission 102 by means of connecting elements 144. Line 140 for feeding the actuation fluid and electric lines 134 for connection with the control device 136 lead to the gear shifting devices 118, 120 and 122.

Figure 3:
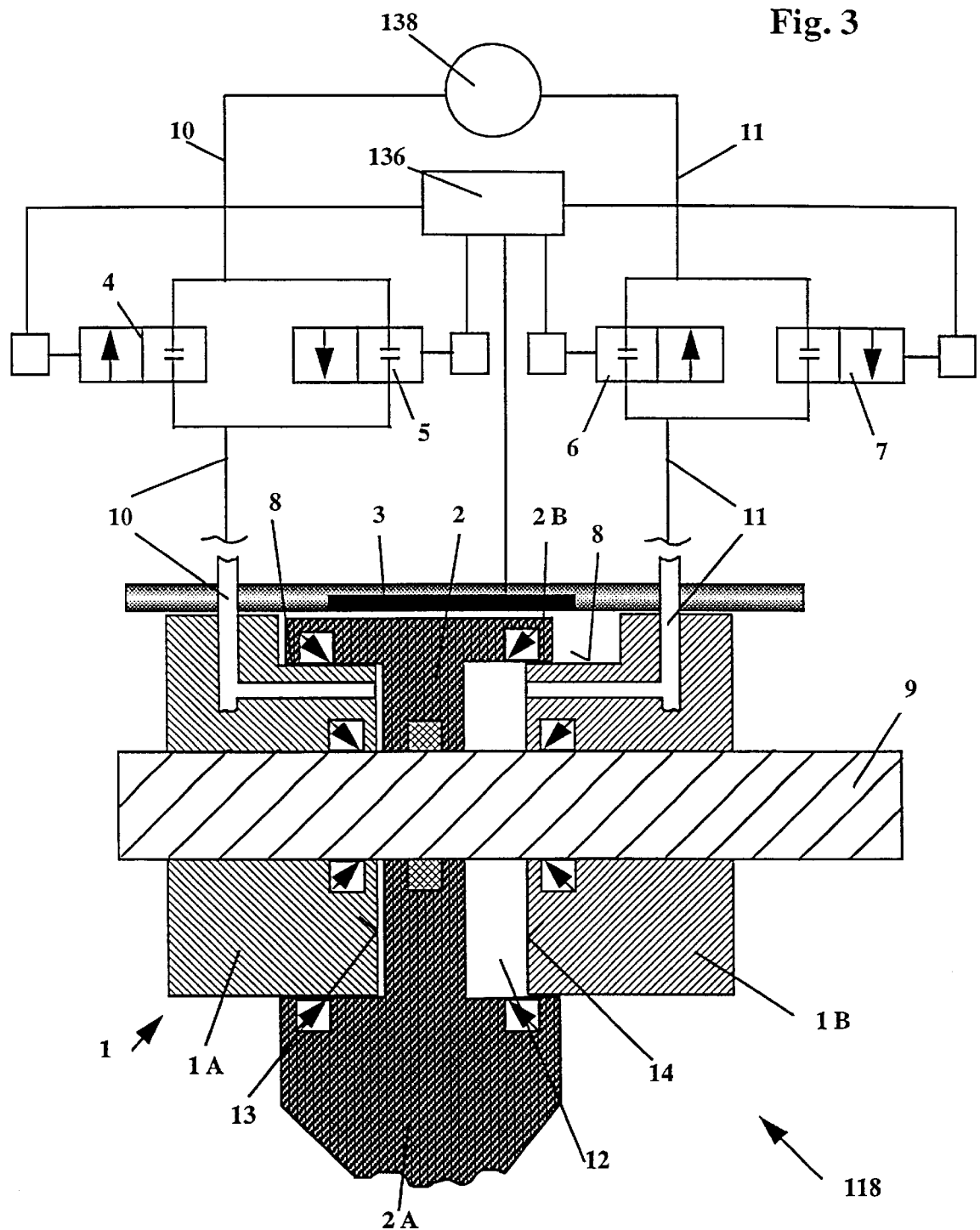
FIG. 3 is a representation of a gear shifting device.

FIG. 3 shows a basic representation of a gear shifting device 118 for an automatic transmission in vehicles, with a displacement measuring device and pulse sensitive directional valves in the longitudinal section, which has a shift cylinder 1, formed by two cylinder parts 1A and 1B, and one piston 2.

By virtue of the configuration of the shift cylinder 1 with two separate cylinder parts 1A and 1B, the weight moved can be considerably reduced.

In the embodiment shown, piston 2, designed as a shift element, moves between the fixed cylinder parts 1A and 1B.

The piston 2 is designed in one piece with a shift fork 2A so connecting elements between the piston 2 and another shift element, such as shift fork 2A or a possible shift lever, are not needed. The connection between piston 2 and shift fork 2A is thus sturdy and formed with the shortest path.

In the same manner in another embodiment (not shown), it is possible that cylinder parts 1A and 1B be connected with the shift fork 2A, such that cylinder parts 1A and 1B move relative to shift piston 2.

As a result of the structurally advantageous design of shift cylinder 1, namely, a design divided in two parts 1A and 1B, the parts 1A and 1B thus can also serve as shift elements whereby a variable transmission configuration is possible.

To detect the position of piston 2 in shift cylinder 1 or between the cylinder parts 1A and 1B, according to FIG. 3, in parallel with the displacement axis of piston 2, a displacement measuring device 3 is attached, e.g. inductive path sensors connected with a control device 36, which, depending on the position of piston 2, detected by the inductive path sensors, relay electronic control signals to pulse-sensitive valves 4, 5, 6 and 7.

The piston 2 has a guide shoulder 2B by which it is guided in a recess 8 formed on each of the cylinder parts 1A and 1B. Both cylinder parts 1A and 1B and the piston 2 are arranged around a rail 9 which extends axially through the cylinder parts 1A and 1B and the piston 2, in the direction of movement of piston 2.

The arrangement of the cylinder parts 1A and 1B and of the piston 2 upon the rail 9 is beneficial mainly in the sense that a series of shift cylinders can thereby be easily arranged in a small space, the reduced number of parts and the easy assembly result in a decisive cost advantage. In principle, the controls for all the gear shifting devices of a transmission can be fitted upon rail 9.

Referring to FIG. 3, the cylinder parts 1A and 1B are fitted firmly, pre-assembled upon rail 9, but they obviously can be fixed in assembled state, depending on the tolerances of the transmission.

To shift piston 2 in shift cylinder 1, a pneumatic or hydraulic pressure is fed to the gear shifting device from an external source 138, via the pressure lines 10 and 11. In each pressure line 10 and 11, two electromagnetic 2/2-way valves, respectively 4, 5 and 6, 7, are interposed, which control the through flow of the pressure medium through pressure lines 10 and 11 in such a manner that the piston 2 moves at a speed corresponding to an optimal speed found empirically or via simulation of the path position. The control mode of the valves can be adapted specifically to the transmission depending on the weights to be shifted.

The pulse-sensitive valves 4, 5, 6 and 7 are designed for continuous operation at 4 volts, but are operated here by 24 volt pulses. By controlling the pulse valves 4, 5, 6 and 7 with strong current pulses, they react very quickly. The pulse valves 4, 5, 6 and 7 are controlled in shift cylinder 1, depending on the position of piston 2, which has been detected by the displacement measurement device 3 via the control device 136. According to the position of piston 2, different electric pulses are delivered to the pulse valves 4, 5, 6 and 7, the pulse valves opening with a predefined low pulse frequency. Thus the through flow of pressure medium changes during a gear shifting operation in shift cylinder 1, which sets piston 2 in shift cylinder 1 in motion and thus also changes the speed of piston 2. The control of the pulse valves 4, 5, 6 and 7 is designed so that all pulse-sensitive valves can be controlled separately, against each other, or jointly, thereby resulting in different piston speeds and also different dynamic forces.

In this manner, the piston speed of each two pulse-sensitive 2/2-way valves is changed so that the piston is moved with as full a pressure force as possible during the shift stroke, up to the beginning of transmission synchronization, and after termination of the synchronization phase is brought to its low speed end position.

To illustrate the operation of the gear shifting device, a gear shifting cycle is described below in principle.

In one gear shifting operation, if pressure medium is fed through line 10 of the gear shifting device, pulse valve 5, which has the function of a feed valve, opens, while pulse valve 4, designed as a drain valve, is closed. Thus, the pressure medium reaches line 10 through cylinder part 1A into the working chamber 12 of piston 2 and moves piston 2 from one stop surface 13 on cylinder part 1A in the direction of stop surface 14 in the cylinder part 1B lying opposite stop surface 13.

At the start of the transmission synchronization phase, shortly before striking the stop surface 14, piston 2 remains in its locked position wherein the pressure load of piston 2 considerably increases by further feeding of pressure medium through line 10.

The part of piston working chamber 12, lying in the direction of motion of piston 2, is relaxed during the whole gear shifting operation, via pressure line 11, and the open pulse valve 6, which is designed as a drain valve. The same time.

At the termination of the synchronization operation, piston 2 is unlocked whereby it is again set in motion in the direction of its end position on stop surface 14, which it does at higher speed due to the high pressure load during the synchronization operation. At the same time, the existing position of piston 2 is detected by the displacement measuring device 3 which controls the pulse valves 6 and 7, via electric pulses, in a manner such that the pulse valve 6, serving as a vent, is closed which results in a so-called cushion of pressure medium drastically reducing the movement of piston 2 on the last portion of the short path toward stop surface 14. The pressure supply via pulse valve 5 to pressure line 10 has already been adjusted during or toward the end of the brief stoppage of piston 2 during the synchronization phase of the transmission, by the closing of feed valve 5. In order to bring piston 2 to its end position, in spite of the pressure medium cushion between piston 2 and stop surface 14, the pulse valve 6 is shifted to an open position by the displacement measuring device 3 immediately before the piston 2 strikes stop surface 14 so that the pressure medium located between piston 2 and stop surface 14 can escape via the pressure line 11 and piston 2, will not spring back when striking stop surface 14.

When reversing, the same shift sequence is in the same inverse direction wherein pulse valves 5 and 6 are closed, the gear shifting device is pressure loaded via the pressure line 11 and open pulse valve 7, and relaxed via open pulse valve 4 and pressure line 10.

In the gear shifting device proposed, a variation of the synchronization times is possible by the electronically controlling the pulsed valves. Thus, different synchronization processes for gear shifts can be carried out on level ground, in downhill gradients and in uphill gradients. During gear shifts on level ground, the synchronization devices can be operated with maximum care. In downhill gradients, the synchronization devices can be loaded with a high pulse frequency and can be utilized up to a maximum load, which can lead to brief safer shifting times. Because of the variability of shifting or synchronizing forces, shifting speeds can be optimized. If the vehicle is also provided with a calculated vehicle weight, the results of the calculation can be included in the control of the pulse frequency. Thus, the synchronization time can be adapted according to the vehicle weight and a further optimization of shift time and careful treatment of the synchronization can be achieved.

To prevent gear shifts in a tooth-on-tooth position of the connecting gears, a monitor of such a position can be provided. When such a case is detected, the synchronization force is minimized in order to obtain a drag torque in the synchronization whereby the tooth-on-tooth position is removed.

When controlling the valves, care must be taken that they are not overloaded. An overload could be generated due to a continuous pulse or to short pauses between the pulses.

| Reference numerals | | | |
|---|---|---|---|
| 1 | shift cylinder | 106 | main gear |
| 1A | cylinder part | 108 | auxiliary gear |
| 1B | cylinder part | 110 | input shaft |
| 2 | piston | 112 | output shaft |
| 2A | shift fork | 114 | output flange |
| 2B | guide shoulder | 116 | gear shifting device |
| 3 | displacement measuring device | 118 | gear shifting device |
| 4 | pulse-sensitive valve | 120 | gear shifting device |
| 5 | pulse-sensitive valve | 122 | gear shifting device |
| 6 | pulse-sensitive valve | 124 | shift fork |
| 7 | pulse-sensitive valve | 126 | sliding sleeve |
| 8 | recess | 128 | shaft |
| 9 | guide rail | 130 | gear wheel |
| 10 | pressure line | 132 | gear wheel |
| 11 | pressure line | 134 | line |
| 12 | working chamber of the piston | 136 | control device |
| 13 | stop surface | 138 | pressure source |
| 14 | stop surface | 140 | line |
| 102 | transmission | 144 | connecting element |
| 104 | clutch bell | | |

What is claimed is:

1. A gear shifting device (118) for connecting parts of a transmission (102) that rotate at different rotational speeds having at least one auxiliary unit, wherein said gear shifting device (118) is actuated by a control fluid, for each auxiliary unit one unit is provided in which valves (4, 5, 6, 7), shift cylinder (1), piston (2) and gear shifting elements (2A) are comprised, said gear shifting device (118) being actuated is electrically controlled, pulsed 2/2-way valves (4, 5, 6, 7) and said gear shifting device (118) is connected with a displacement measuring device (3) whose signals can be transmitted to said 2/2-way valves (4, 5, 6, 7) and lead to a control of said 2/2-way valves (4, 5, 6, 7) which depends on the position detected by said displacement measuring device (3) of said piston (2), in relation to said shift cylinder (1), wherein the pulse frequency of said 2/2-way valves (4, 5, 6, 7) when said gear shifting device (118) closes is higher than when said gear shifting device (118) opens.

2. The gear shifting device (118) according to claim 1, wherein the pulse frequency of said 2/2-way valves (4, 5, 6, 7) is different in gear shifts on level ground from the pulse frequency in gear shifts on non-level ground.

3. The gear shifting device (118) according to claim 2, wherein the pulse frequency of said 2/2-way valves (4, 5, 6, 7) in gear shifts on level ground is lower than the pulse frequency in gear shifts on non-level ground.

4. The gear shifting device (118) according to claim 1, wherein the pulse frequency of said 2/2-way valves (4, 5, 6, 7) can be controlled depending on the weight of the vehicle.

5. The gear shifting device (118) according to claim 1, wherein the pulse frequency of said 2/2-way valves (4, 5, 6, 7) is higher when said gear shifting device (118) is closed then when said gear shifting device (118) is open.

6. The gear shifting device (118) according to claim 1, wherein said 2/2-way valves (4, 5, 6, 7) are loaded with a voltage which corresponds to a multiple of the standard voltage of the valve.

7. The gear shifting device (118) according to claim 1, wherein said displacement measuring device (32) is situated within said shift cylinder (1).

8. The gear shifting device (118) according to claim 1, wherein said displacement measuring device (3) is provided outside said shift cylinder (1).

9. The gear shifting device (118) according to claim 1, wherein said piston (2) is situated upon a piston rod (9) on which said piston is axially movable.

10. The gear shifting device (118) according to claim 1, wherein for several auxiliary units several gear shifting devices (118, 120, 122) are provided, one gear shifting device being associated with each auxiliary unit.

11. The gear shifting device (118) according to claim 10, wherein said multiple gear shifting devices (118, 120, 122) are disposed in one row.

12. The gear shifting device (118) according to claim 10, wherein said pistons (2) of said multiple gear shifting devices (118, 120, 122) are situated upon a common piston rod (9).

13. The gear shifting device (118) according to claim 10, wherein said multiple gear shifting devices (118, 120, 122) are provided in a separate part (116) said part connectable with said transmission (102).

14. The gear shifting device (118) according to claim 13, wherein the operations of said part (116) can be adjusted and tested independently of said transmission (102).

15. The gear shifting device (118) according to claim 1, wherein stops are provided which dampen a stroke of said pistons (2) on the edges of said shift cylinder (1).

16. The gear shifting device (118) according to claim 15, wherein said stops are provided within said shift cylinder (1).

17. The gear shifting device (118) according to claim 15, wherein said stops are situated outside said shift cylinder (1).

18. The gear shifting device (118) according to claim 1, wherein means for detecting a tooth-on-tooth gear position are provided, and by reducing synchronization forces, a drag torque can be obtained whereby the tooth-on-tooth gear position can be removed.

19. A vehicle gear shifting device (118) with an open position and a closed position for connecting parts of a transmission (102) that rotate at different rotational speeds, having at least one auxiliary unit, wherein said gear shifting device (118) is actuated by a control fluid, each auxiliary unit comprising valves (4, 5, 6, 7), shift cylinder (1) having edges on inside and on outside, piston (2), and gear shifting elements, said gear shifting device (118) is actuated via electrically controlled 2/2-way valves (4, 5, 6, 7) with pulse frequencies and voltages, said gear shifting device (118) is connected with a displacement measuring device (3) with output signals, said device measures displacement of said piston in relation to said cylinder, said output signals are transmitted to said 2/2-way valves (4, 5, 6, 7) and said signals control said 2/2-way valves (4, 5, 6, 7) depending on the position of said piston (2) detected by said displacement measuring device (3) in relation to said shift cylinder (1), wherein the pulse frequency of said 2/2-way valves (4, 5, 6, 7) when said gear shifting device (118) closes is higher than the pulse frequency when said gear shifting device (118) opens.

* * * * *